United States Statutory Invention Registration [19]

[11] Reg. Number: H637

Baciak [43] Published: Jun. 6, 1989

[54] METHOD AND APPARATUS FOR RAPID OPTICAL PHASING

[75] Inventor: Mark G. Baciak, Albuquerque, N. Mex.

[73] Assignee: The United States of America as represented by the Secretary of the Air Force, Washington, D.C.

[21] Appl. No.: 857,621

[22] Filed: Apr. 30, 1986

[51] Int. Cl.[4] ..... G01B 11/00; G01B 9/02

[52] U.S. Cl. ..... 356/363; 356/345

[58] Field of Search ..... 356/363, 345, 358, 346; 350/600

[56] References Cited

U.S. PATENT DOCUMENTS

| | | | |
|---|---|---|---|
| 3,363,104 | 1/1968 | Waite et al. | 250/199 |
| 3,523,735 | 8/1970 | Taylor | 356/106 |
| 3,527,537 | 9/1970 | Hobrough | 356/106 |
| 3,936,193 | 2/1976 | Auth | 356/106 |
| 4,097,150 | 6/1978 | Wu | 356/72 |
| 4,355,900 | 10/1982 | Nussmeier | 356/356 |
| 4,583,855 | 4/1986 | Bareket | 356/351 |
| 4,600,308 | 7/1986 | Waite | 356/363 |

*Primary Examiner*—Stephen C. Buczinski
*Assistant Examiner*—Linda J. Wallace
*Attorney, Agent, or Firm*—Jules J. Morris; Donald J. Singer

[57] ABSTRACT

A method and apparatus 10 for rapid optical phasing of optical devices utilizing white light interference fringe finding. The apparatus comprises a white light source 12, a beam splitter 18, a scanning mirror 20 and a stationary reflective surface 24. The scanning mirror 20 is moved in piston while reflected light is observed in an electro-optic sensor 32 at a receiver 28. A nulled pattern has been previously established at the receiver 28. An electrical signal from the electro-optic sensor is mounted at amplification and recording means 34 to identify variations in reflected light intensity that are caused by white light fringes. White light fringes only occur at zero optical difference, i.e. when the scanning mirror and stationary reflected surface are in phase.

13 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD AND APPARATUS FOR RAPID OPTICAL PHASING

STATEMENT OF GOVERNMENT INTEREST

The invention described herein may be manufactured and used by or for the Government for governmental purposes without the payment of any royalty thereon.

TECHNICAL FIELD

This invention relates to the use of Michaelson interferometers for white light interferometry and in particular relates to a method and apparatus for rapid phasing of telescopes and other optical devices.

BACKGROUND OF THE INVENTION

Zero optical path difference is used to bring optical devices such as telescopes into phase. Optically phasing an array of multiple telescopes permits the formation of a synthetic aperture.

Synthetic apertures are formed when separate optical systems are combined to function as a single larger aperture. When an aperture is synthesized, independent optical systems are phased to form a common image field with resolution determined by the maximum dimension of the array and therefore exceeding that produced by any single element. By optically phasing an array of multiple telescopes, a synthetic aperture is formed which can achieve the performance of an equivalent sized, single large telescope.

Phased arrays are also modular. They can be built in stages and to some extent, be operational as soon as the first telescope is operational. Such an array of independent telescopes has functional flexibility, several simultaneous operations can be carried out by individual telescopes within a synthetic aperture. For example, images can be directed to different cameras or spectrographic devices for simultaneous observation in separate imaging modes. When operated as a transmitter, a synthetic aperture has the option of sending beams in different directions.

Phased array apertures have virtually no size limitations. By modularly combining telescopes in a phased configuration, telescopes and transmitters of previously unimaginable sizes can be constructed. Large optics fabrication has historically posed an impermeable barrier to building large aperture telescope systems. By phasing a number of reasonably-sized telescopes, this manufacturing barrier can be broken. Interferometers are devices that make use of the wave characteristics of light in order to measure length or changes in length with extreme accuracy. Michaelson interferometers are based on amplitude splitting of a light beam from a narrow band light source. Light from the light source is split into two beams by a 45° beam splitting, partially reflective plate and is transmitted to two different reflecting surfaces. One of the reflecting surfaces is generally a reference mirror which reflects the split beam back to the beam splitting plate. A second reflective surface is formed at a telescope or other optical device for which optical path length difference is to be compared to the reference. The second reflective surface reflects light from the second of the split beams back to the beam splitter where the beams are recombined and directed to a receiver. The receiver may be a screen, photocell or human eye. Depending on the difference between the distances from the beam splitter to the two reflective surfaces the two beams will interfere constructively or destructively. This interference results in the formation of interference fringes at the receiver.

In white light, with its many wavelengths, the fringes can only be formed if the path difference in part of the field of view is made zero. This is because the spectral separation of the successive regions of constructive interference in white light are too close to be perceived. Since white light comprises different wavelengths (different colors of light) fringes appear colored close to zero optical path difference and disappear at larger path differences. If there is a one half cycle relative phase shift at the beam splitter, the fringe at zero optical path difference is black and can be distinguished from the neighboring fringes. Formation of the black fringe therefore discloses that the two surfaces (reference and telescope) are very close to zero optical path difference and nearly in phase.

White light fringes differ in total intensity very little or not at all from the very muted white light generally received. Further, light contrast between light and dark fringes (stripes) is generally very small. As a result, when using an interferometer to phase telescopes, simple photo optical systems for detecting hite light fringes have been unsuccessful. Manually observing the interferometer image to detect white light fringes is also a difficult and tedious job. The movable reflective surface must be very slowly moved over a period of hours for the fringes to be detected. Even at such slow scanning speeds, however, the low contrast fringes can easily be missed by a careful observer. Thus the phasing of multiple optical devices is a long tedious job.

In view of the above it is an object of this invention to provide an interferometer that is useful to rapidly determine zero optical path difference for the phasing of optical devices.

A further object of this invention is to provide a method of determining zero optical path difference using white light interferometry that is capable of overcoming variation in interference fringe contrasts.

Yet another object of this invention is to provide an automated system for the phasing of telescopes.

SUMMARY OF THE INVENTION

The invention comprises an interferometer having a white light source, a beam splitter, a scanning mirror and a reflective surface which is affixed to or forms a part of the optical device to be examined for zero optical path. The interferometer also comprises an optical receiver having an electro-optic sensor for sampling light at the receiver in order to detect changes in light intensity and convert them to electrical signals. The electrical signals from the electro-optic sensor are transmitted to a recording and amplification device which is used to determine the presence of the interference fringes which accompany zero optical path difference between the scanning mirror and the optical device.

In a preferred embodiment of the invention the apparatus is set up in a manner which results in a nulled image at the receiver prior to phasing of optical devices. This is to ensure that the optical sensor will perceive changes in intensity rather than being positioned to sense both light and dark bands which would cancel out changes in intensity.

In a preferred embodiment of the invention the scanning mirror further comprises precise measurement and drive means. This measurement and drive means is preferably a motorized micrometer which is used to adjust the path length of the scanning mirror relative to the beam splitter.

A further aspect of the preferred embodiment is that the amplification and recording device comprises an operational amplifier circuit as well as an oscilloscope and electronic level detector. The electronic level detector is preset to detect changes in amplitude of the electronic signal from the electro-optical sensor. The electronic level detector is preset to arrest movement of the scanning mirror at approximately zero optical difference as determined by the interference fringes.

Another aspect of the invention comprises a method of phasing a plurality of optical devices. The method comprises transmitting light through a beam splitter to a reference mirror and an optical device to be phased. Light reflected from the reference mirror and the optical device are recombined at the beam splitter and directed to a receiver. Light at the receiver is converted by an electro-optical sensor to an electrical signal which is transmitted to a detection and amplification means. The optical device is then moved along the path of light directed to it (i.e., in piston) from the beam splitter until a variation in light intensity at the receiver indicates that there is zero optical difference between the reference mirror and the optical device being tested. The first optical device tested can then be considered a reference and this process repeated with other optical devices to be phased.

BRIEF DESCRIPTION OF THE DRAWINGS

The foregoing and other objects and advantages of the invention will be apparent from the following more particular description of the preferred embodiments of the invention, as illustrated in the accompanying drawings, in which like reference characters refer to the same parts throughout the different views. The drawings are not necessarily to scale, emphasis instead being placed upon illustrating the principles of the invention.

DETAILED DESCRIPTION OF THE INVENTION

Figure 1:
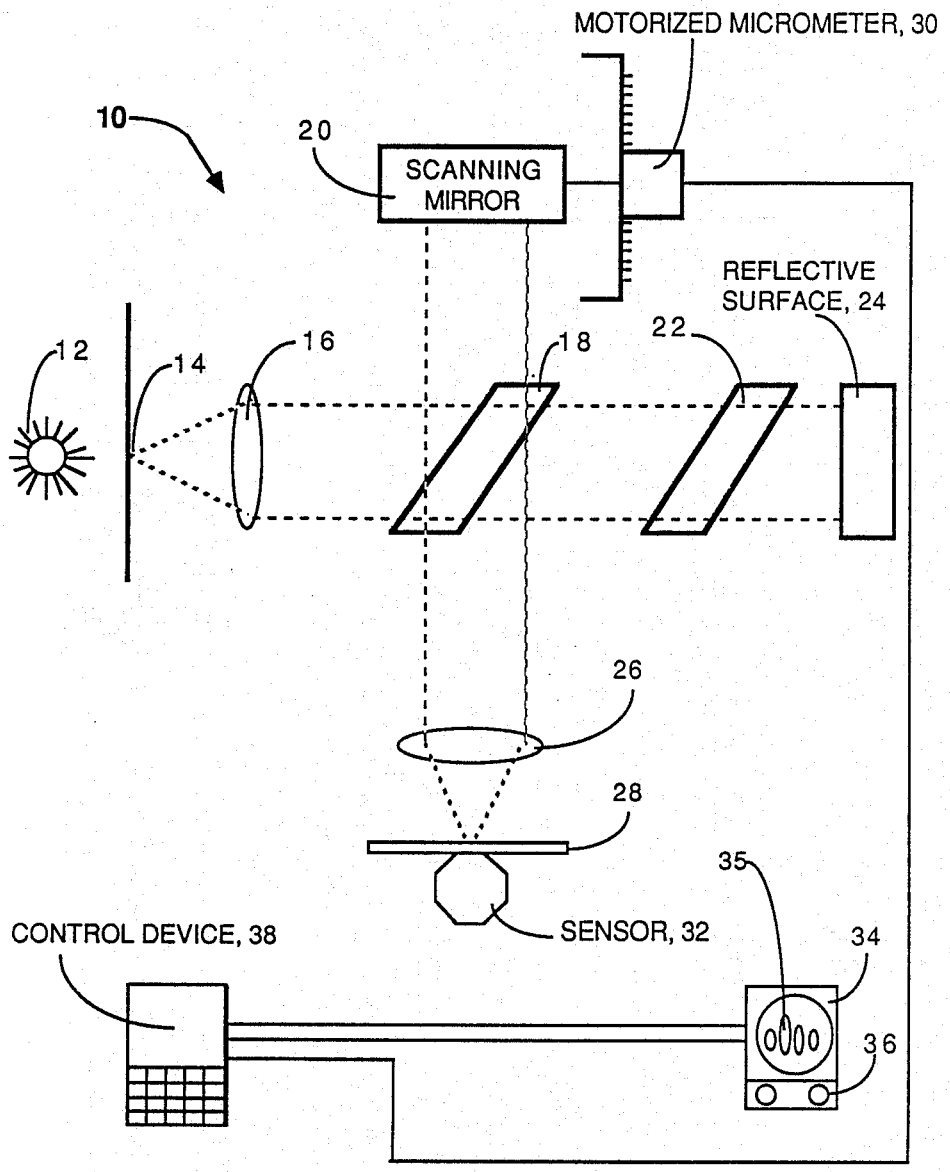
FIG. 1 is a schematic representation of an apparatus for rapid phasing of optical devices embodying the principles of the invention.

The phasing apparatus 10 of FIG. 1 provides a mechanism which allows use of a fast technique for finding the white light fringes that identify zero optical path difference between two reflecting surfaces. This technique replaces the tedious manual procedure generally used when phasing optical devices.

The apparatus is most closely related to the conventional Michaelson interferometer. As is common with Michaelson interferometers a light source 12 is used to provide a point source 14 from which the light, represented by dotted lines, is collimated by a collimating lens 16. Collimated light then falls upon a beam splitting plate 18. The beam splitting plate is preferably a half silvered mirror which reflects 50% of the incident light and transmits an equal amount. This results in the formation of two light beams.

Light transmitted through the beam splitter travels through a compensating lens 22 which compensates for the thickness of the beam splitter 18 and then falls upon a reflective surface 24. The surface 24 is preferably part of, or in a fixed relationship to; a telescope or other optical device for which zero optical path is to be determined.

Light reflected from the beam splitter travels to a scanning mirror 20. Scanning mirror 20 reflects light back through the light splitter 18 where it is recombined with light reflected from reflective surface 24. The recombined beam is then transmitted to a focusing lens 26 which focuses the light at a receiver 28. Focusing lens 26 is optional and not required in some applications.

Scanning mirror 20 is preferably a 6 inch mirror driven by a motorized micrometer 30. The micrometer is capable of moving the mirror 20 at the rate of one-half inch per 90 seconds. The mirror moves exactly perpendicular to the incident light beams which is sometimes called "in piston." As the mirror 20 is moved in piston light intensity is monitored at receiver 28.

Associated with the receiver 28 is an electro-optic sensor 32 which is used to sample light intensity. The electro-optic sensor comprises a light detector and operational amplifier that translates the light signal received into an electrical signal. This sensor is described in detail below with reference to FIG. 2.

The electrical signal is fed to an amplification and display device which preferably comprises an oscilloscope 34. The oscilloscope 34 is used to display the very small change in light intensity observed by the sensor 32 at the point of zero optical path difference between mirror 20 and reflective surface 24, and the beam splitter 18.

The oscilloscope is preferably a scanning oscilloscope that allows selection of the sampling frequency and displays the sample. The screen sweep time is a function of the sampling frequency. This allows the viewer to see a time display of the sensor output. A beneficial sampling frequency to use is 500 msec and the sweep time to fill the screen is approximately 2 sec. FIG. 1 shows the configuration in use. Peak fringe amplitude is shown at the center lobe 35. Although visual inspection is still required, the speed of the scans and the amplification at the oscilloscope screen makes detection of zero optical path difference very easy.

Figure 2:
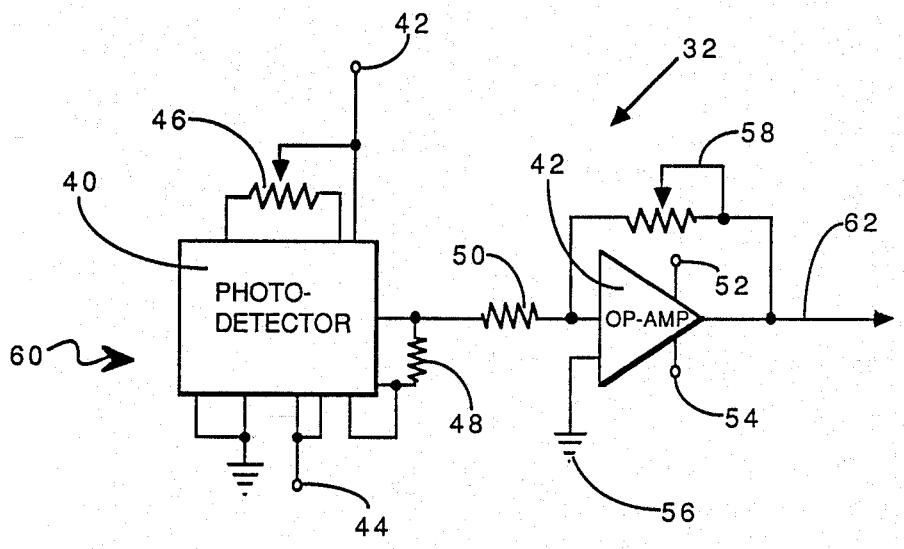
FIG. 2 is a schematic of an electro-optic sensor suitable for use with this invention.

An example of an electro-optic sensor 32 suitable for use with this invention is shown in detail in FIG. 2. The sensor 32 comprises two major elements a photodetector 40 and an operational amplififier (op amp) 42. An example of a suitable photodetector is model HAD-1100A by E. G. & G; a suitable op amp is model LF356 and equivalents by a variety of manufacturers.

Photodetector 40 has a positive power input at terminal 42 and negative power input at terminal 44. Photodetector gain and feedback are controlled at potentiometer 46 and the photodetector output is matched for the op amp input by resistors 48 and 50.

The op amp is connected to a positive power supply at terminal 52, a negative power supply at terminal 54 and ground at terminal 56. Gain and feedback are controlled by operation of potentiometer 58.

Light is sensed by the photodetector at arrow 60 and converted into an electrical signal which is amplified and transmitted at output 62. The transmitted signal is modulated as the input light signal varies. The electrical signal is then preferably transmitted to oscilloscope 34.

An automated version of this device includes a limit setting mechanism 36 (FIG. 1). An amplitude limit is set which, when reached by the electrical signal generated by sensor 32, results in a signal being sent to a control device 38. The control device 38, which may comprise a conventional microprocessor such as made by Hewlett Packard or Digital Equipment Corporation, immediately, upon receiving such a limit signal, halts movement of motorized micrometer 30 in order to arrest the scanning mirror at zero optical path difference.

Use of a microprocessor to precisely determine optical path distance is detailed in U.S. patent application Ser. No. 689,700, now U.S. Pat. No. 4,689,758, by Richard A. Carreras entitled "Microcomputer Controlled Image Processor" filed Jan. 8, 1985 and a related application Ser. No. 743,338, now U.S. Pat. No. 4,667,090, by Carreras et al entitled "Synthetic Aperture Multi-Telescope Tracker" filed June 10, 1985, both are assigned to the United States Air Force. The method of operation of this device, however, may be readily understood in reference to the method of use described below.

Initially the image at receiver 28 is nulled with laser light fringes prior to searching for the white light fringes that reveal zero optical path difference. An interference pattern can be relatively easily formed by use of a laser light source and adjustment of the scanning mirror. When mirrors 20, 24 are tilted in relation to each other, interference stripes appear at the receiver. As the tilt is decreased the stripes become thicker and until the fringes are circles and the area sensed by sensor 32 is either full bright or full dark. The tilt is corrected so that during difficult white light fringe finding, the sensor will sense a light intensity change and not an overlapping series of interference patterns that might camouflage changes in light intensity. Use of a null pattern allows liberal movement of the sensor over the interference pattern and full detector sampling without losing the ability to discern changes in light intensity. A sensitivity check of the sensor output signal can be performed so that the desired modulation amplitude can be predetermined and the detection limit can be set either at the oscilloscope 34 or at the monitoring computer 38.

When an initial zero optical path difference check on a first telescope of an optical array is performed using a white light source, mirror 24 represents a part of the telescope or a mirror that is in a fixed relationship to the telescope's optics. Scanning mirror 20 is then driven by motorized micrometer 30 until a modulation of the light intensity at receiver 28 is detected by electro-optic detector 32. At such a time computer 38 arrests movement of motorized micrometer 30 and therefore scanning mirror 20. This initial scanning is done at a high micrometer speed. If the micrometer slightly overshoots zero optical path difference, it will still be detected by the microprocessor and the scanning mirror 20 can be moved slowly until the modulation reoccurs at receiver 28. At such a time the optical path difference between mirror 20 and receiver 28, and telescope 24 and receiver 28, is zero or substantially near zero.

The fringes that result in the amplitude modulation are formed in white light as the path difference in part of the field is made zero. As mentioned above, only a few fringes appear in white light because the optical distance path varies for the different wavelengths of different colors of light. Accordingly, the fringes first to appear close to zero path difference are colored and disappear at larger path differences where the spectral separation of the successive regions of interference is too close to be discerned. If there is a one half cycle relative phase shift at the beam splitter the fringes of zero path difference are black and can easily be distinguished by the oscilloscope and detector 34. Further fine tuning can be done with the use of a laser replacing white light beam 12. Use of a laser to fine tune zero optical path difference is described in detail in U.S. patent application Ser. No. 698,962, now U.S. Pat. No. 4,639,586, by Janet S. Fender et al, filed Feb. 6, 1985 entitled "Optically Phased Laser Transmitter" and assigned to the United States Air Force. The arduous job of initially finding the white light fringes is quickly done with the use of the invention of this applicat,ion.

After the first telescope is brought in phase with the reference mirror the next in a series of telescopes can be brought in phase with the first phased telescope. The micrometer is read in order to determine the distance between each optical telescope and the beam splitter 18. When these distances are compared with the original telescope (which now can be considered a reference) the optics of the telescopes can be adjusted so that the optical path will be the same for all the telescopes. When zero optical path difference for all the telescopes is established, the telescopes are in phase.

In phase telescopes can almost be considered as one large telescope comprising all the images, commonly called a synthetic aperture. The images from all the telescopes can be superimposed to provide an image as bright and detailed as that which would be produced by a much larger telescope. Alternatively the phased telescopes can be used as a light or laser transmitter to transmit light beams of cumulative power from several sources.

Figure 3:
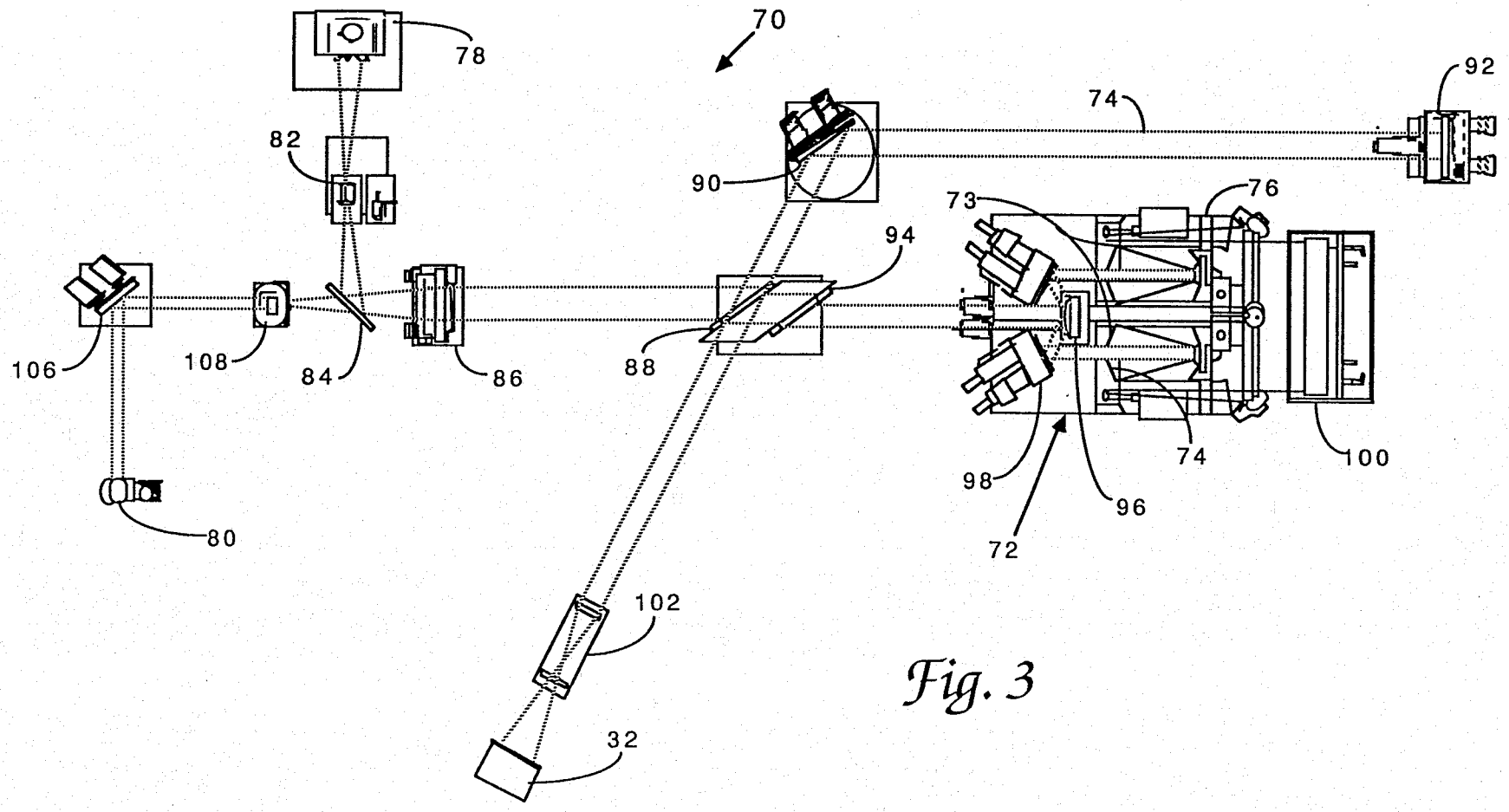
FIG. 3 is a schematic representation of an optical phasing apparatus utilizing this invention for phasing an array of telescopes.

FIG. 3 is a schematic representation of a phased array telescope system 70 which incorporates the white light fringe finding apparatus and techniques of this invention. The system incorporates a telescope assembly 72 having three primary lenses 74 (one not shown) and three secondary lenses 76 (one not shown). The telescope assembly 72 therefore is made up of three telescopes 73. In order to produce the best possible combined image from the telescopes all the telescopes must be in phase to avoid light wave interference. This is accomplished by reflecting light through the telescope optics and searching for white light fringes with an interferometer.

The exemplary interferometer shown in FIG. 3 is similar to the interferometer of FIG. 1. A white light source 78 or laser source 80 can be used with the interferometer and telescope. Ihe white light source is used to determine zero optical path difference. White light is projected through a spatial filter 82 which diffracts light from light source 78. The expanding light beam is reflected by mirror 84 into a colimating lens 86. Collimated light is then projected to a beam splitter 88. Two light beams are emitted by the beam splitter 88 which partially reflects and partially transmits light. Reflected light travels to a mirror 90 which reflects the light onto a reference mirror 92. Transmitted light passes through a compensating lens 94 and into the telescope assembly 72. All of the mirrors and lenses of the interferometer are mounted on platforms that control their angle and tilt.

Light entering the telescope is reflected through a beam divider 96 that divides the light into three beams, each of which is reflected through one of the three telescopes. In the view of FIG. 3 only two of the telescopes 73 are visible, the third telescope is identical to the other two and has been omitted for clarity.

Light from the beam divider 96 next encounters the reflectors of optical path distance adjusters (OPDA's)

98 of each of the telescopes. The optical path distance adjusters are used to change the optical path to each of the telescopes so that telescope phasing can be accomplished.

Light reflected from each of the optical path difference adjusters travels to the secondary lens 76 of one of the telescopes 73 and thence diverges to the respective primary lens 74. Light from the primary lenses 74 is transmitted to a retro-flat mirror 100 which reflects the light back through the telescope to the beam splitter 88. The retro-flat 100 does not form a portion of the telescope assembly 72 but is used during phasing of the telescopes 73.

Light returning to the beam splitter 88 from reference mirror 92 and telescope assembly 72 is recombined and reflected to optical focusing assembly 102 which projects the image onto optical detector 32 (same as in FIGS. 1 and 2).

In operation, a first telescope 73 is phased with reference mirror 92 utilizing white light interferometry as detailed in reference to FIG. 1. In this situation, however, optical path length is changed by adjusting the optical path distance adjuster 98 of the telescope being brought into phase. The first phased telescope is then used as a reference and the remaining two telescopes 73 are sequentially brought in phase with it by adjustments of their optical path distance adjusters 98. All three telescopes are thus brought into phase to form a synthetic aperture combining the images of the three telescopes 73.

In some instances laser light is used with the interferometer to fine tune the phasing of the telescopes. Laser light from laser 80 is reflected by mirror 106 into a spatial filter 108 and through the reverse of mirror 84 into the interferometer set-up previously described.

After the telescopes are brought into phase an active control system can be added to maintain telescope phasing during telescope operation.

Phased arrays of optical telescopes have many advantages over large optical telescopes. Large optical telescopes are extremely expensive to produce because of the great sizes of lenses required. Further the lenses are extremely heavy and require very expensive equipment to move with precision. In contrast, small telescopes are relatively easy to manufacture with virtually perfect lenses and can be moved much more precisely due to their lower mass. Phased arrays of small optical telescopes can be used to produce optical images comparable or superior to those produced by large single lens telescopes.

In the past, arrays of telescopes or individual telescopes have been manually adjusted for zero optical path differences in white light. At zero optical path difference in white light all the frequencies of the color components of the light reinforce each other rather than interfere. In order to get the best possible results with optical telescopes, light wave interference must be minimized by establishing zero path optical difference to get the brightest clearest image. Further, spectral analysis of objects such as distant stars requires a image in which the various colored wavelengths of lights do not interfere. Ihe destructive interference of color wavelengths destroys the usefulness of a spectral analysis as an aid in determining the elements of a star.

In many instances it is impossible to raise the contrast of the light fringes when phasing telescopes. As a result the light fringes may be virtually impossible to discern with human eye. Use of this type of interferometer with the electro-optical sensor, operational amplifier and display devices makes detection of very low contrast, white light fringe possible. Further, the use of a microcomputer 38 allows for much more rapid movement by a scanning mirror or optical path distance adjuster.

While the invention has been particularly described with reference to the preferred embodiments thereof, it will be understood by those skilled in the art that various changes in substance and form can be made therein without having departed from the spirit and the scope of the invention as detailed in the attached claims.

I claim:

1. An apparatus for establishing zero optical path difference between optical devices so that they can be operated in phase, utilizing an interferometer comprising a light source, a beam splitter for splitting a light beam from the light source and a reference mirror for reflecting a portion of the light beam split by the beam splitter, and wherein the apparatus for phasing optical devices further comprises:

(a) a reflecting mirror positioned in a known fixed relationship with the optical device for which zero optical path difference is to be established and which reflects a portion of the light beam split by the beam splitter and wherein said optical device comprises an optical path distance adjuster;

(b) an optical receiver for displaying combined light reflected from said reference mirror and said reflecting mirror;

(c) an electro-optical sensor for sampling light at said optical receiver as the optical path between said optical receiver and said reflecting mirror is changed by said optical path distance adjuster on said optical device; and (d) an amplification and display device for amplifying and displaying signals from said electro-optical sensor in order to discern a predetermined light intensity variation at said optical receiver which signifies zero optical path difference between said optical receiver and both said reference mirror and said reflecting mirror.

2. The apparatus of claim 1 wherein said amplification and display deice comprises an oscilloscope.

3. The apparatus of claim 1 wherein said electro-optical sensor comprises a light detecting semiconductor device and a high gain operational amplifier.

4. The apparatus of claim 1 wherein said optical device comprises a telescope which is part of an array of telescopes arranged for use as a synthetic aperture.

5. The apparatus of claim 1 further comprising an electronic signal level detector for detecting variations in signal strength emanating from said electro-optical sensor.

6. The apparatus of claim 5 wherein said signal detector is electronically connected to the optical path adjuster so that movement of said optical path adjuster is arrested when said signal detector detects a predetermined variation in signal strength emanating from said electro-optical sensor, the predetermining light intensity variation corresponding to zero optical path difference.

7. A method of phasing a plurality of optical devices comprising the steps of:

(a) transmitting a light from a white light source through a beam splitter to a reference mirror and a first optical device;

(b) reflecting light from said reference mirror back to said beam splitter for recombination;

(c) reflecting light from said first optical device back to said beam splitter for recombination with light reflected from said reference mirror;

(d) directing recombined light from the reference mirror and said first optical device onto a receiver;

(e) sensing light directed onto said receiver with an electro-optical detector in order to produce an electrical signal proportional to variations in light intensity;

(f) adjusting the optical path to said first optical device;

(g) detecting variations in the electrical signal produced by the electro-optic detector;

(h) arresting changes to the optical path in response to detected variations in the electrical signal when zero optical path difference is achieved between said receiver and both said first optical device and said reference mirror;

(i) repeating the above procedure with a second optical device; and (j) establishing zero optical path difference between said receiver and both said reference mirror and said second optical device in order to indicate that both optical devices are in phase.

8. The method of phasing a plurality of optical devices described in claim 7 wherein the first optical device is at reference position relative to a receiver and all other optical devices are moved so that there is a zero optical path difference between different optical devices and said receiver.

9. The method of phasing a plurality of optical devices described in claim 7 further comprising the step of collimating light from said light source prior to its transmission to said beam splitter.

10. The method of phasing a plurality of optical devices described in claim 7 further comprising the step of transmitting an electrical signal to said optical path adjuster in order to arrest optical path changes when the electro-optical detector senses a variation in light intensity at said receiver.

11. The method of phasing a plurality of optical devices described in claim 7 wherein said light source comprises a white light point source.

12. The method of phasing a plurality of optical devices described in claim 7 wherein said optical devices are telescopes.

13. The method of phasing a plurality of optical devices described in claim 11 further comprising the step of nulling a laser light interference pattern on said receiver prior to searching for variations in white light intensity at said receiver.

* * * * *